US007008156B2

(12) United States Patent
Imai et al.

(10) Patent No.: US 7,008,156 B2
(45) Date of Patent: Mar. 7, 2006

(54) LOAD TRANSFER APPARATUS

(75) Inventors: Akira Imai, Asaka (JP); Yutaka Imai, Asaka (JP); Tatsuo Goda, Tokyo (JP)

(73) Assignee: Atushi Imai, Saitama (JP)

( * ) Notice: Subject to any disclaimer, the term of this patent is extended or adjusted under 35 U.S.C. 154(b) by 0 days.

(21) Appl. No.: 10/324,920

(22) Filed: Dec. 20, 2002

(65) Prior Publication Data

US 2003/0185642 A1   Oct. 2, 2003

(30) Foreign Application Priority Data

Mar. 26, 2002  (JP)  ............................. 2002-086534

(51) Int. Cl.
 *F16B 31/00*  (2006.01)
(52) U.S. Cl. ..................... 411/14.5; 411/434
(58) Field of Classification Search ............... 411/14.5, 411/432, 433, 434
See application file for complete search history.

(56) References Cited

U.S. PATENT DOCUMENTS 2,213,992 A * 9/1940 Morse .......................... 474/84
2,610,614 A * 9/1952 Sedgwick ..................... 91/382
4,927,305 A * 5/1990 Peterson, Jr. .................. 411/14
5,339,693 A * 8/1994 Rowlands et al. ............ 73/825
5,468,106 A * 11/1995 Percival-Smith ............ 411/434
6,251,197 B1 * 6/2001 Toda ........................... 148/319

FOREIGN PATENT DOCUMENTS

EP          0 365 157      *  4/1990
GB          2247928 A      *  3/1992

* cited by examiner

*Primary Examiner*—William L. Miller
(74) *Attorney, Agent, or Firm*—McCormick, Paulding & Huber LLP

(57) ABSTRACT

A first load-receiving member having a cylinder and a screw hole through which a bolt is thread-engaged and a second load-receiving member having a piston and a fastening face that is made in contact with a member to be fastened are attached to a nut, and a number of balls made of steel the surface of which is lubricated by grease are loaded into a pressure chamber that is formed as a compartment by the cylinder and the piston. Since these balls exert fluidity in the pressure chamber, a load applied to the balls is transmitted to the cylinder and the piston through the balls by screwing the input bolt. Thus, the first load-receiving member is moved in the axis direction with respect to the second load-receiving member, thereby applying a tensile force to the bolt.

8 Claims, 12 Drawing Sheets

LOAD TRANSFER APPARATUS

TECHNICAL FIELD OF THE INVENTION

The present invention relates to a load transmission device which transmits a load inputted from a load-applying means to a load-receiving member through a pressure-transmitting medium.

BACKGROUND OF THE INVENTION

A load transmission device is provided with a first load-receiving member and a second load-receiving member that is assembled so as to be relatively movable with respect to the first load-receiving member, and a pressure chamber is formed as a compartment between these load-receiving members. The pressure chamber is filled with a pressure-transmitting medium, and a pressure, that is, a load applied by the load-applying means is transmitted to the first and second load-receiving members through the pressure-transmitting medium. With respect to the pressure-transmitting medium for use in such a load transmission device, a fluid such as hydraulic oil and nitrogen gas is generally used.

With respect to devices using hydraulic oil as the pressure-transmitting medium, a hydraulic nut and a bolt tensioner have been known, which preliminarily apply a load in a tensile direction to a bolt when fastening a member to be fastened by using a nut and the bolt.

The hydraulic nut is provided with a first ring-shaped member in which a screw hole and a cylinder through which a bolt is engaged with a screw are formed and a second ring-shaped member in which a fastening face that is made in contact with the member to be fastened and a piston that is attached so as to be movable in the axis direction relative to the cylinder are installed, and a pressure chamber is formed as a compartment between the cylinder and the piston. Further, a hydraulic pressure, that is, hydraulic oil is supplied from a hydraulic pump to the pressure chamber so that the first ring-shaped member is moved in the axis direction with respect to the second ring-shaped member, thereby making it possible to apply a load in the tensile direction onto the bolt.

Meanwhile, the bolt tensioner is provided with a housing that is placed to the member to be fastened, a load-receiving piston that is attached to the inside of this housing so as to be relatively movable in the axis direction, and a load-receiving cover that is secured to the housing to form a pressure chamber together with the load-receiving piston. Then, by supplying hydraulic pressure to the pressure chamber from the hydraulic pump, it is possible to apply a load in the tensile direction to the bolt through a rod that is secured to the load-receiving piston.

Moreover, with respect to the load transmission devices, those using gas such as nitrogen gas as the pressure-transmitting medium have been known, and as the load transmission devices of this type, an accumulator, which is installed in a hydraulic pipe connecting the hydraulic pump and a hydraulic apparatus, has been known.

The accumulator is used for effectively utilizing energy as an auxiliary power source and obtaining a high flow rate that greatly exceeds the pump capability by accumulating and discharging hydraulic pressure generated by a hydraulic pump. In addition, it is used for absorbing a surge pressure that occurs due to pulse movements of the hydraulic pump and a sudden close of a valve of the pipe system. For example, in the case of an accumulator of a bladder type, a housing, which is made of metal with a hollow space therein and connected to the hydraulic pipe, and a partition wall made of rubber and referred to as a bladder, which is installed inside the housing and partitions the inside of the housing into a pressure chamber for sealing nitrogen gas therein and an oil chamber that communicates with the hydraulic pipe, are installed. Thus, it becomes possible to absorb pulse movements and a surge pressure that occur in the hydraulic oil due to compressing property of the nitrogen gas sealed in the pressure chamber.

In the load transmission devices of this type, since the pressure-transmitting medium is a fluid such as hydraulic oil and nitrogen gas, and since the pressure-transmitting medium to be supplied to the pressure chamber is subjected to a load to increase the pressure, seal members are placed in a sliding portion and the like such as a cylinder and a piston that form a pressure chamber. For example, in the hydraulic nut, the seal member is placed on the circumferential portion of the piston that slides on the cylinder, and in the accumulator, the seal member is placed on a lid member that closes a nitrogen gas inlet. With respect to these seal members, O-rings, U-packing, X-rings and the like have been used in many cases, and in these cases, elastic materials such as rubber and plastic are used as the materials thereof; thus, even in the case when a gap in the sliding parts is increased by an applied pressure distortion, the seal member is elastically deformed in accordance with a change in this gap to maintain the sealing property.

SUMMARY OF THE INVENTION

However, in such load transmission devices, for example, in the hydraulic nut and the bolt tensioner, as the screw diameter of the bolt to be used upon fastening is increased, the pressure inside the pressure chamber, that is, the hydraulic pressure of the hydraulic oil is increased accordingly, with the result that the hydraulic pressure tends to reach not less than 70 Mpa, in some cases, an ultra-high pressure of not less than 200 Mpa. Moreover, depending on installation environments, these may be used under high-temperature environments exceeding 200 degrees. In such cases, the above-mentioned seal members fail to withstand such a pressure and a temperature, making it difficult to prevent the leakage of the pressure-transmitting medium.

In order to prevent this problem, metal rings of a plurality of stages, hard plastic and U-cup-shaped seal members made of metal that are resistant against high pressure and high temperature have been used in some cases. However, it is difficult to obtain sufficient flexibility since the shearing strength within the limitation of the elasticity of the sealing member is limited and it is also difficult to obtain a highly reliable sealing since the fatigue life is short. Consequently, in order to deal with such high pressure and high temperature, special expensive sealing members or complex sealing structures need to be used, resulting in cost increase in the load transmission device.

Moreover, the fact that the hydraulic pressure inside the pressure chamber is limited by the characteristics of the sealing member causes the subsequent difficulty in the size and weight reduction of the load transmission device that transmits a greater load. In other words, for example, since the pressure chamber in the hydraulic nut and the bolt tensioner is formed so as to have a ring shape located outside of a bolt or a rod connected to the bolt, in an attempt to reduce the size of the hydraulic nut or the bolt tensioner, the pressure receiving area of the load-receiving member in the pressure chamber needs to be reduced so as to reduce the outer diameter dimension. However, in an attempt to obtain the same output with the pressure-receiving area being reduced, the hydraulic pressure to be supplied to the pressure chamber needs to be increased, with the result that the size and weight reduction of the load transmission device are limited by the performance of the sealing member.

Moreover, there are various kinds of hydraulic oil to be used for load transmission devices of this type, and there are limitations in use conditions such as pressure resistant property, heat resistant property, thermal expansion property and chemical compatibility with the seal member. Also, when the seal member is damaged, the hydraulic oil might leak from the pressure chamber to cause a fire or the like depending on the installation environments of the device. Therefore, the installation environments of the load transmission member are limited, resulting in a reduction in its versatility.

In the case of the accumulator, since the performance of the accumulator is directly dependent upon the pressure of nitrogen gas filled in the bladder, it becomes important to control the pressure of the nitrogen gas. However, in the case when the hydraulic pressure in the hydraulic pipe is high, the pressure of nitrogen gas to be injected in the pressure chamber is also set to a high pressure, with the result that the gas leakage tends to occur from a gap between the nitrogen gas inlet and the lid member. Therefore, frequent gas pressure controlling operations are required. In contrast, in an attempt to prevent a reduction in the gas pressure, a special sealing member needs to be applied to the nitrogen gas inlet, resulting in the cost increase of the accumulator. Moreover, since the injecting process of high-pressure gas such as nitrogen gas is a dangerous process, the injecting process has various limitations such as special qualification that is required in compliance with high-pressure gas security law, resulting in a reduction in the versatility of the accumulator.

An object of the present invention is to reduce costs in the load transmission device.

Another object of the present invention is to achieve the size and weight reduction of the load transmission device.

Still another object of the present invention is to improve the versatility of the load transmission device.

The load transmission device according to the present invention, which preliminarily applies a load to a bolt that is thread-engaged with a nut to fasten a member to be fastened, is provided with: a first load-receiving member having a screw hole through which the above-mentioned bolt is thread-engaged; a second load-receiving member that is placed to the above-mentioned member to be fastened and assembled onto the above-mentioned first load-receiving member so as to be relatively movable in the axis direction to form a pressure chamber as a compartment together with the first load-receiving member; a pressure-transmitting medium that is injected into the above-mentioned pressure chamber and composed of spherical members the surface of which is lubricated; and load-applying means which is installed in at least either one of the first and second load receiving members and applies a load onto the above-mentioned pressure-transmitting medium, wherein a load in the tensile direction is applied to the above-mentioned bolt by the above-mentioned pressure-transmitting medium through the above-mentioned first load-receiving member.

The load transmission device of the present invention is further provided with: a lock member for supporting the load of the first load-receiving member, which has a female screw portion that is thread-engaged with a male screw portion that is placed on the outer circumferential face of either one of the first and second load-receiving members and a load-supporting face that is made in contact with the end face of the other of the first and second load-receiving members.

In the load transmission device of the present invention, the above-mentioned male screw portion and female screw portion are respectively prepared as sawtooth screws.

In the load transmission device of the present invention, the above-mentioned load-applying means is provided with: a fastening screw member, in which a small-diameter female screw portion, which has a first lead corresponding to a lead of the bolt and is thread-engaged with the bolt, is formed in the inner circumferential face of the fastening screw member and a large-diameter male screw portion, which has a second lead smaller than the first lead and is thread-engaged with a large-diameter female screw portion formed in the second load-receiving member with the same direction as the small-diameter female screw portion, is formed on the outer circumferential face of the fastening screw member.

In the load transmission device of the present invention, the above-mentioned small-diameter female screw portion and large-diameter male screw portion are respectively prepared as sawtooth screws.

The load transmission device according to the present invention, which preliminarily applies a load to a bolt that is thread-engaged with a nut to fasten a member to be fastened, is provided with: a housing placed to the above-mentioned member to be fastened, to which a load-receiving piston having a rod that is detachably attached to the above-mentioned bolt is attached so as to be reciprocally movable in the axis direction; a load-receiving cover which is secured to the above-mentioned housing so as to form a pressure chamber as a compartment together with the above-mentioned load-receiving piston, to which a pressure-transmitting medium is filled; a load input piston which is formed into a disc shape that is made in sliding-contact with the inner circumferential face of the above-mentioned housing, and which is installed in the above-mentioned housing so as to be reciprocally movable in the axis direction in a coaxial manner with the above-mentioned load-receiving piston; and a load-transmitting member which is installed between the above-mentioned load input piston and the above-mentioned pressure chamber so as to be reciprocally movable in the axis direction so that a load that has been applied to the above-mentioned load input piston is transmitted to the above-mentioned pressure-transmitting medium, wherein a load in the tensile direction is applied to the above-mentioned bolt by the above-mentioned pressure-transmitting medium through the above-mentioned load-receiving piston.

The load transmission device according to the present invention, which preliminarily applies a load to a bolt that is thread-engaged with a nut to fasten a member to be fastened, is provided with: a housing placed to the above-mentioned member to be fastened, to which a load-receiving piston formed integrally with the above-mentioned bolt is attached so as to be reciprocally movable in the axis direction; a load-receiving cover which is secured to the above-mentioned housing so as to form a pressure chamber as a compartment together with the above-mentioned load-receiving piston to which a pressure-transmitting medium is filled; a load input piston which is formed into a disc shape that is made in sliding-contact with the inner circumferential face of the above-mentioned housing, and which is installed in the above-mentioned housing so as to be reciprocally movable in the axis direction in a coaxial manner with the above-mentioned load-receiving piston; and a load-transmitting member which is installed between the above-mentioned load input piston and the above-mentioned pressure chamber so as to be reciprocally movable in the axis direction so that a load that has been applied to the above-mentioned load input piston is transmitted to the above-mentioned pressure-transmitting medium, wherein a load in the tensile direction is applied to the above-mentioned bolt by the above-mentioned pressure-transmitting medium through the above-mentioned load-receiving piston.

In the load transmission device of the present invention, the pressure-receiving area of the above-mentioned load-transmitting member is set to be smaller than the pressure-receiving area of the above-mentioned load-receiving piston and the load to be transmitted to the above-mentioned load-receiving piston becomes greater than the load applied to the above-mentioned pressure-transmitting medium by the above-mentioned load-transmitting member.

In the load transmission device of the present invention, a load is applied onto the above-mentioned load input piston through a hydraulic pressure.

In the load transmission device of the present invention, a load is applied onto the above-mentioned load input piston through a jack screw.

In the load transmission device of the present invention, the above-mentioned pressure-transmitting medium is composed of spherical members the surface of which is lubricated.

The load transmission device of the present invention is provided with: a first load-receiving member; a second load-receiving member that is assembled to the above-mentioned first load-receiving member so as to be relatively movable to form a pressure chamber as a compartment together with the first load-receiving member; a pressure-transmitting medium that is injected into the above-mentioned pressure chamber and composed of spherical members the surface of which is lubricated; and load-applying means which is installed in at least either one of the first and second load receiving members, and applies a load onto the above-mentioned pressure-transmitting medium, wherein a load applied onto the above-mentioned pressure-transmitting medium is transmitted to the above-mentioned first and second load-receiving members through the above-mentioned pressure-transmitting medium.

In the load transmission device of the present invention, the pressure-receiving area of the above-mentioned load-applying means is set to be smaller than the pressure-receiving area of the above-mentioned first or second load-receiving member and the load to be transmitted to the above-mentioned first or second load-receiving member becomes greater than the load to be applied to the above-mentioned pressure-transmitting medium by the above-mentioned load-applying means.

In the load transmission device of the present invention, the inner face of the above-mentioned pressure chamber that is made in contact with the above-mentioned pressure-transmitting medium is made of steel that has been thermally treated through a carburization quenching process or a nitriding method.

In the load transmission device of the present invention, the above-mentioned spherical members include rigid spherical bodies.

In the load transmission device of the present invention, the above-mentioned spherical members include elastic spherical bodies.

In the load transmission device of the present invention, the above-mentioned spherical members include rigid spherical bodies and elastic spherical bodies.

In the load transmission device of the present invention, the above-mentioned spherical members include a plurality of kinds of members having respectively different diameters.

In the present invention, the pressure-transmitting medium that is injected into the pressure chamber formed as a compartment between the first load-receiving member and the second load-receiving member is prepared as spherical members the surface of which is lubricated. Therefore, it becomes possible to eliminate the necessity of the sealing member for preventing the leakage of the pressure-transmitting medium from the pressure chamber, and thus, it becomes possible to reduce the costs of the load transmission device. Moreover, since the load to be applied to the pressure-transmitting medium is not limited by the characteristics of the sealing member, it becomes possible to set the transmission load in the pressure chamber to a great value and to achieve the size and weight reduction of the load transmission device. Furthermore, since the pressure-transmitting medium is prepared as the spherical members, it is possible to eliminate the limitations from the use conditions, and since no leakage of the pressure-transmitting medium occurs from the pressure chamber, it is possible to adapt the load transmission device to wide installation environments, and consequently to improve the versatility of the device.

Moreover, in the present invention, the inner surface of the pressure chamber that is made in contact with the spherical members is made of steel that has been subjected to a thermal treatment. Therefore, it is possible to improve the load-transmitting efficiency in the load-transmitting member.

Moreover, in the present invention, since the spherical members include rigid spherical bodies and elastic spherical bodies, it is possible to properly absorb vibration and the like to be applied to the pressure chamber, and it is also possible to evenly adjust the load between the spherical members and consequently to improve the load transmitting efficiency of the load transmission device.

Furthermore, in the present invention, since the spherical members are prepared as a plurality of kinds of spherical members having respectively different diameters, it becomes possible to improve the load transmission efficiency in the load-transmitting member.

Furthermore, in the present invention, since the load input piston is formed into a disc shape that is made in contact with the inner circumferential face of the housing, and since the pressure-receiving area of the load-transmitting member is set to be smaller than the pressure-receiving area of the load-receiving piston, it is possible to achieve the size and weight reduction of the load transmission device.

DESCRIPTION OF THE PREFERRED EMBODIMENTS

Embodiments of the present invention will be described in detail with reference to the drawings.

Figure 1:
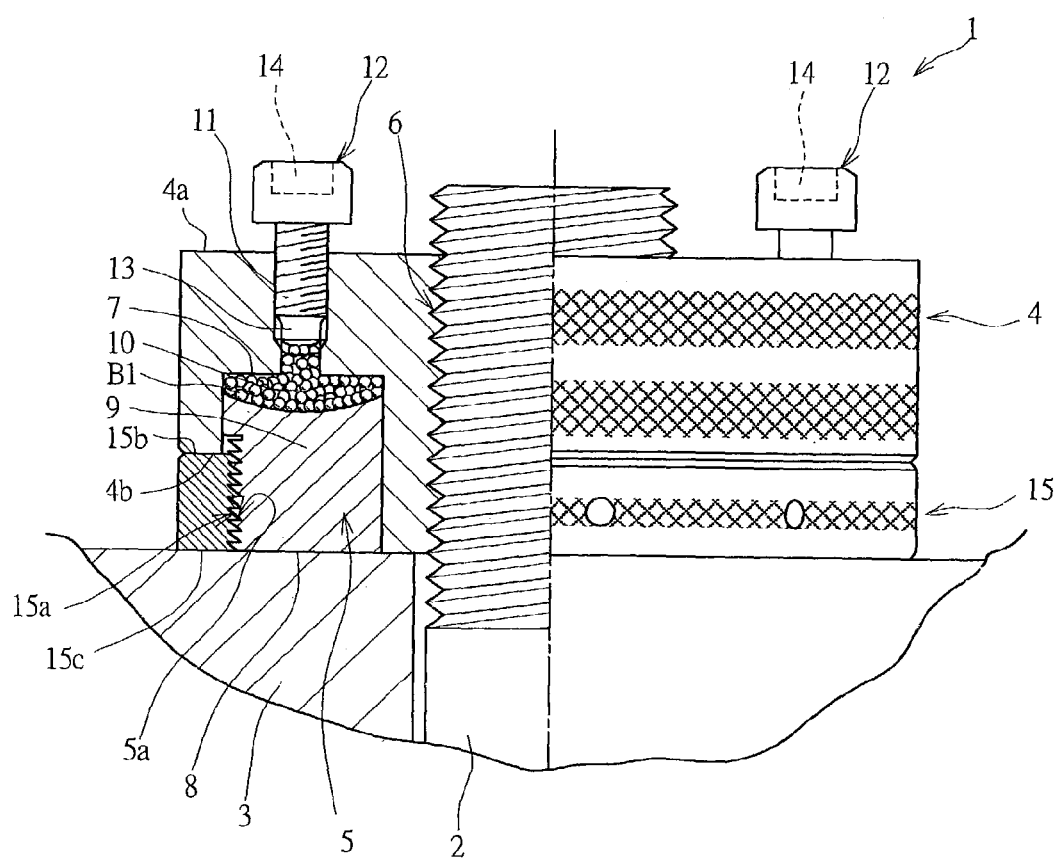
FIG. 1 is a cross-sectional view that shows an application state (prior to a fastening process) of a nut according to an embodiment of the present invention.
Figure 2:
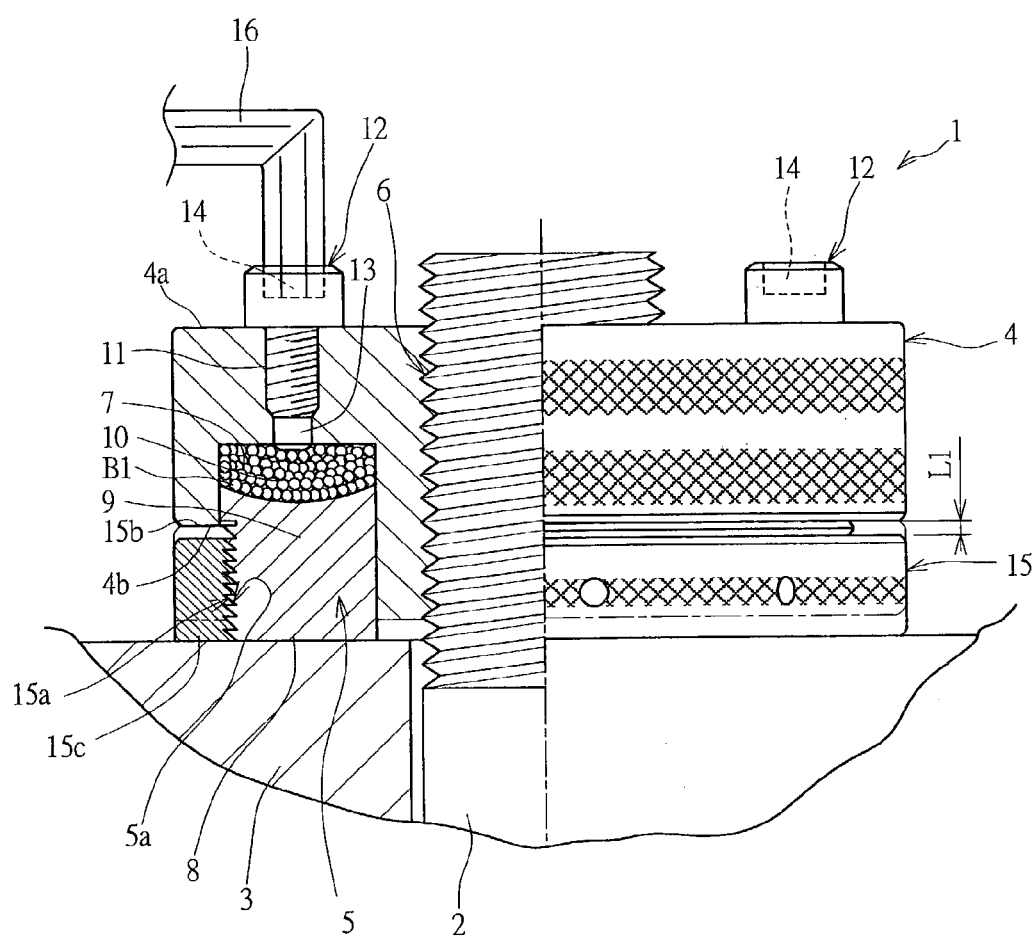
FIG. 2 is a cross-sectional view that shows an application state (after the fastening process) of the nut shown in FIG. 1.

FIG. 1 is a cross-sectional view that shows an application state (prior to a fastening process) of a nut according to an embodiment of the present invention, and FIG. 2 is a cross-sectional view that shows an application state (after the fastening process) of the nut shown in FIG. 1.

The nut 1 which serves as a load transmission device is thread-engaged with a bolt 2 so as to fasten a member to be fastened 3, and it preliminarily applies a load on the bolt 2 so as to allow the bolt 2 after the fastening process to have an axial force, thereby preventing the slackness of the fastening. For this reason, the nut 1 is provided with a first load-receiving member 4 and a second load-receiving member 5.

The first load-receiving member 4 is formed into an approximately ring shape in its outer shape and provided with a screw hole 6 that is screw-engaged with a bolt 2 that is inserted into a through hole 3a formed in the member to be fastened 3 and a cylinder 7 that is formed into a ring shape.

The second load-receiving member 5, which is made of steel and formed into an approximately ring shape in its outer shape, is provided with a fastening face 8 that is made in contact with the member to be fastened 3 and a piston 9 that is formed into a ring shape. The second load-receiving member 5 is assembled onto the first load-receiving member 4 so as to be relatively movable in the axis-direction, with the piston 9 being attached to the cylinder 7 so as to be slidable in the axis direction.

A ring-shaped pressure chamber 10 composed of the cylinder 7 and the piston 9 is formed as a compartment between the first load-receiving member 4 and the second load-receiving member 5 so that the capacity of the pressure chamber 10 is changed by a relative movement of the first load-receiving member 4 and the second load-receiving member 5.

Two input screw holes 11, each penetrating from the end face 4a positioned at an upper portion in the drawing toward the pressure chamber 10, are formed in the first load-receiving member 4, and input bolts 12, which respectively serve as load-applying means, are thread-engaged with the input screw holes 11. The end portion of each of these input bolts 12 forms an input piston 13, and a hexagonal hole 14, which is engaged with a hexagonal wrench, is formed in its head portion. Thus, by screwing these input bolts 12 toward the inside of the pressure chamber 10, the input pistons 13 are moved from the input screw holes 11 toward the inside of the pressure chamber 10. Here, in this embodiment, two pairs of the input screw hole 11 and input bolt 12 are respectively provided to the first load-receiving member 4. However, it is not limited to this arrangement, and these may be provided to the second load-receiving member 5, and the number of these members may be desirably set.

The pressure chamber 10 is filled with a number of balls B1 that serve as a pressure-transmitting medium made of spherical members, and these balls B1 are made of steel. Moreover, these balls B1, which serve as rigid spherical bodies, have fluidity in the pressure chamber 10. With respect to the relationship between the cylinder 7 and the piston 9, assuming that the initial uniform gap in the radius direction in the state where the cylinder 7 and the piston 9 are not used is set to $g0$ and the additional uniform gap in the radius direction due to deformation strain in the state where the cylinder 7 and the piston 9 are used and a predetermined load is applied thereto is set to $g1$, the radius r of each of these balls B1 is set to at least $r>(g0+g1)$. Here, in the case when the gap between the cylinder 7 and the piston 9 is biased in one direction and the balls B1 might be sandwiched by the gap, the relationship is set to $r>2\times(g0+g1)$. Moreover, the radius r of each ball B1 is set in a range which allows a plurality of these balls to be physically placed in the pressure chamber 10 constituted of the cylinder 7 and the piston 9; thus, the size is set so as to maintain the fluidity as the pressure-transmitting medium.

The smaller the radius r of each ball B1, the greater the number of contact points between the balls becomes, and the pressure-contact centripetal force is dispersed so that the compression stress imposed on the contact surface is alleviated. However, the partial concentration of an excessive contact stress tends to occur due to an increase in the number of unstable inter-spherical frictional-force points and the subsequent inhibition in the uniform transmitting property of the load. The reason for this phenomenon is explained as follows. In the case when respective balls B1 are pressed to each other at a contact point upon application of loads, forces exerted on each ball B1 are a centripetal force toward the center of the ball B1 and a rotating force exerted in the tangent direction of the ball surface caused by friction between the balls, and in an ideal state, assuming that no friction exists between the balls, a plurality of centripetal pressing force vectors exerted at a contact point between the ball surface and the surface of the cylinder 7 or the piston 9 or a contact point against another ball B1 are cancelled, and the balls are moved until the sum of the force vectors at the center point of the ball B1 that is the center of gravity has become zero, and balanced to be stabilized. However, in an actual process, a rotating force due to friction in the tangent direction is also exerted and the ball B1 is moved and rotated due to a composite force vector of the above-mentioned centripetal force and the frictional tangent force. Consequently, as the radius r of the ball B1 becomes smaller, the number of contact points between the balls increases to disperse the centripetal pressing force. However, the number of frictional force points which form an unstable factor is increased simultaneously with the result that the uniformity of the inter-spherical active force becomes unstable, causing unevenness in the load distribution in the pressure chamber 10. Therefore, it is important to prevent the occurrence of unevenness in the pressure distribution due to residual frictional tangent force exerted between the balls, by lubricating the balls to smoothly slide on each other, without depending on only the improvement of the inherent rotation performance of the balls B1. In this case, assuming that each ball B1 shifts in the infinite space without friction on the surfaces of the contact balls B1, it is possible to easily set the sum of the force vectors in the center of the ball to zero. However, in the case of an aggregate of the balls B1 filled in the sealed space, it is necessary to uniformly set the active force vectors including frictional forces exerted on the ball surfaces and consequently to maintain a stable state under constant pressure conditions. The frictional force exerted on the surface of each ball always forms a force in the tangent direction on the ball surface to cause a rotation force in the ball B1. For this reason, in the present invention, the surfaces of the cylinder 7 forming the pressure chamber 10, the piston 9 and the balls B1 are subjected to thermal treatments such as a carburization quenching process or a nitriding method so as to have high surface hardness, and the surfaces of the balls B1 are coated with grease so that the grease is allowed to lubricate contact points between the balls as well as between the balls B1 and the cylinder 7 or the piston 9.

Therefore, it is possible to reduce unstable force vectors caused by frictional force between the balls B1, to improve the movement between the balls, and also to generate fluidity in the balls B1 as an aggregate, thereby making it possible to uniformly distribute the active force between the balls even in the pressure chamber 10 that is a limited sealed space. Consequently, it becomes possible to improve the load transmitting efficiency in the nut 1. Additionally, in this embodiment, the lubrication of the balls B1 is carried out by using grease. However, it is not limited to this method. Preservation and lubricating viscous liquids and solid powder such as graphite are also available.

In this manner, the radius r of each ball B1 is selected and set to a size that is not too small within a range that satisfies such strength as to prevent the generation of partial buckling due to point compressive stress. For this reason, since these balls having the radius r are free from dropping from the sliding section between the cylinder 7 and the piston 9, that is, from the pressure chamber 10, it is possible to eliminate the necessity of special sealing members to be placed at the sliding portion between the cylinder 7 and the piston 9, in particular, special sealing members and the like that are used in the case when a high pressure is applied as the pressure of the pressure transmitting medium inside the pressure chamber 10, and consequently to reduce the costs of the nut 1. Moreover, since the load to be applied to the pressure transmitting medium is not limited by the characteristics of the sealing members, the load to be applied to the balls B1, that is, the transmission load can be set to a high value and the pressure-receiving area of each of the load-receiving members 4 and 5 can be consequently set to a small value. Therefore, it becomes possible to achieve the size and weight reduction of the nut 1. Furthermore, it is possible to eliminate the limitations in use conditions such as pressure resistant property, heat resistant property, thermal expansion property and chemical compatibility with the seal member that are caused when hydraulic oil or the like is used as the pressure-transmitting medium, and consequently to prevent the leakage or the like of the hydraulic oil due to damages and the like of the seal member. Therefore, it becomes possible to adapt the nut 1 to wide installation environments, and consequently to improve the versatility of the device.

A male screw portion 5a is formed on the outer circumferential face of the second load-receiving member 5, and a lock ring 15, which serves as a ring-shaped lock member having a female screw portion 15a in the inner circumferential face thereof, is thread-engaged with the male screw portion 5a. The male screw portion 5a and the female screw portion 15a are formed as saw-tooth screws in their screw shape, and they can support a greater load when a load applied to the lock ring 15 is exerted downward in the drawing. The lock ring 15 is rotated in the circumferential direction with respect to the second load-receiving member 5 so that it is allowed to be reciprocally movable in the axis direction. Then, a load-supporting face 15b (end face on the upper side in the drawing), which is formed perpendicularly to the axis direction of this lock ring 15, is aligned to face with an end face 4b on the lower side in the drawing of the first load-receiving member 4 and made in contact with the same. Here, in this embodiment, the lock ring 15 is formed on the outer circumferential face of the second load-receiving member 5. However, it is not limited to this arrangement, and this may be placed on the outer circumferential face of the first load-receiving member 4. In this case, the load-supporting face 15b is made in contact with the end face of the second load-receiving member 5.

Next, the operation of the nut 1 as described above will be described.

First, the input bolt 12 is sufficiently loosened to the state shown in FIG. 1, that is, the state in which the second load-receiving member 5 is placed on the member to be fastened 3 with the end face 15c on the side of the member to be fastened 3 of the lock ring 15 and the fastening face 8 being made in contact with the member to be fastened 3 and the load supporting face 15b of the lock ring 15 being made in contact with the end face 4b of the first load-receiving member 4. In this state, the screw hole 6 of the first load-receiving member 4 is thread-engaged with the bolt 2.

Next, as shown in FIG. 2, the respective input bolts 12 are tightened alternately by using a hexagonal wrench 16 little by little.

In this case, the input piston 13 of the input bolt 12 is moved toward the inside of the pressure chamber 10 so that the balls B1 injected into the pressure chamber 10 are subjected to a load from the input bolt 12. Then, this load is transmitted to the cylinder 7 and the piston 9 through these balls B1 so that the first load-receiving member 4 is moved upward in the drawing in the axis direction with respect to the second load-receiving member 5 that contacts the member to be fastened 3. Further, the first load-receiving member 4 is moved to the upper side in the axis direction of the first load-receiving member 4 so that the bolt 2, which is thread-engaged with the screw hole 6 in the first load-receiving member 4, is subjected to a load in the upward tensile direction in the drawing, that is, a tensile force. In other words, the load applied to the balls B1 applies the tensile force onto the bolt 2 through the first load-receiving member 4. This tensile force allows the bolt 2 to extend in the axis direction, and as shown in FIG. 2, a gap L1 is created between the load-supporting face 15b of the lock ring 15 and the end face 4b of the first load-receiving member 4.

Next, the lock ring 15 is rotated to make the load-supporting face 15b of the lock ring 15 and the end face 4b of the first load-receiving member 4 in contact with each other as indicated by the chain line shown in FIG. 2, and in this state, the input bolt 12 is rotated in the loosening direction. Thus, the load that has been transmitted from the input bolt 12 to the cylinder 7 and the piston 9 through the balls B1 inside the pressure is lowered; however, since the first load-receiving member 4 is limited in its movement with the load that is applied by the tensile force of the bolt 2 being supported by the lock ring 15, the tensile force of the bolt 2 is applied onto the fastening face 8 of the second load-receiving member 5 from the first load-receiving member 4 through the lock ring 15, with the result that the fastening process of the member to be fastened 3 is carried out with an axial force being generated in the bolt 2. The axial force of the bolt 2 allows the fastening face 8 of the nut 1 to tightly contact the member to be fastened 3, thereby preventing the slackness of the fastening.

Figure 3:
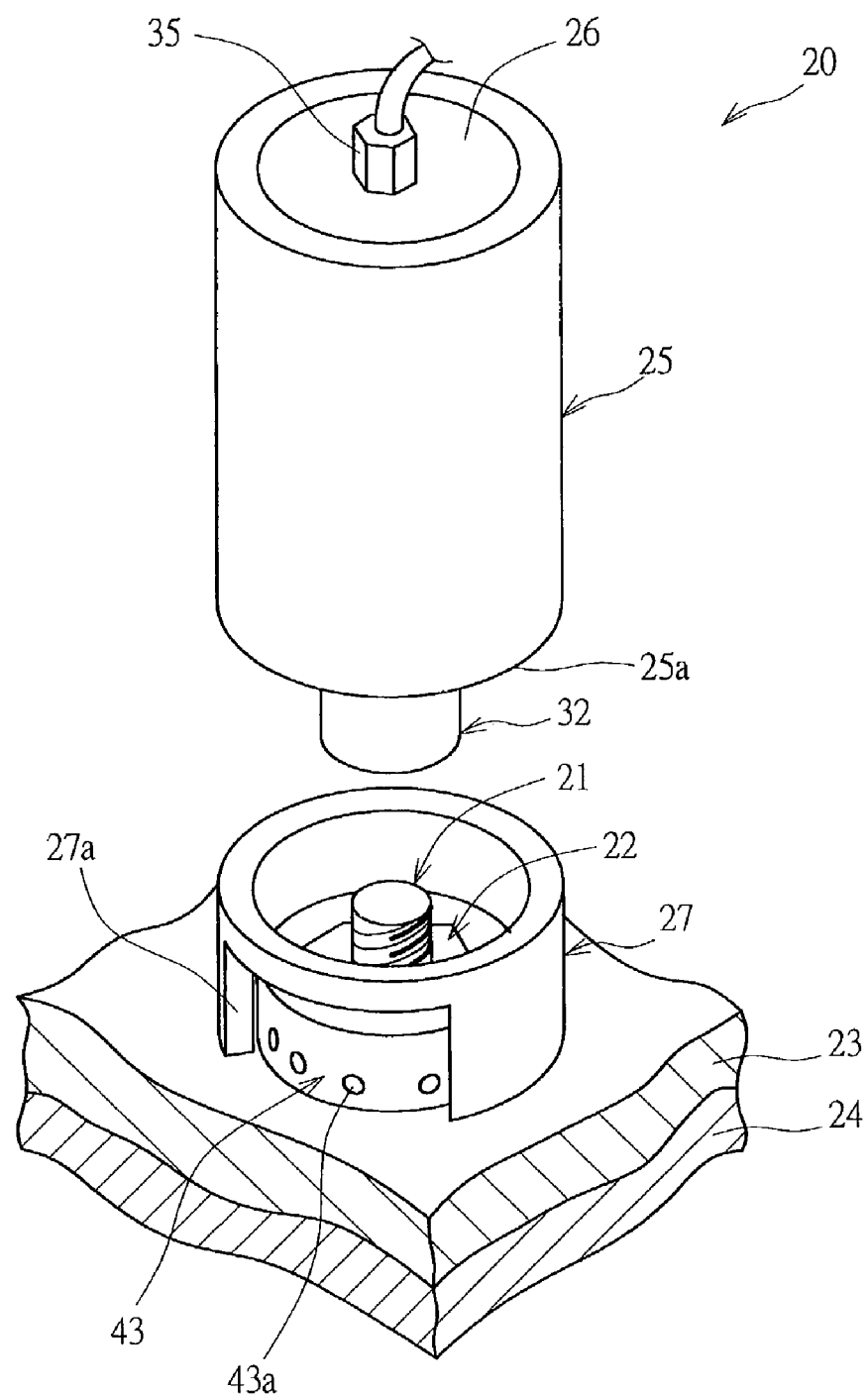
FIG. 3 is a perspective view that shows an external appearance of a bolt tensioner according to an embodiment of the present invention.
Figure 4:
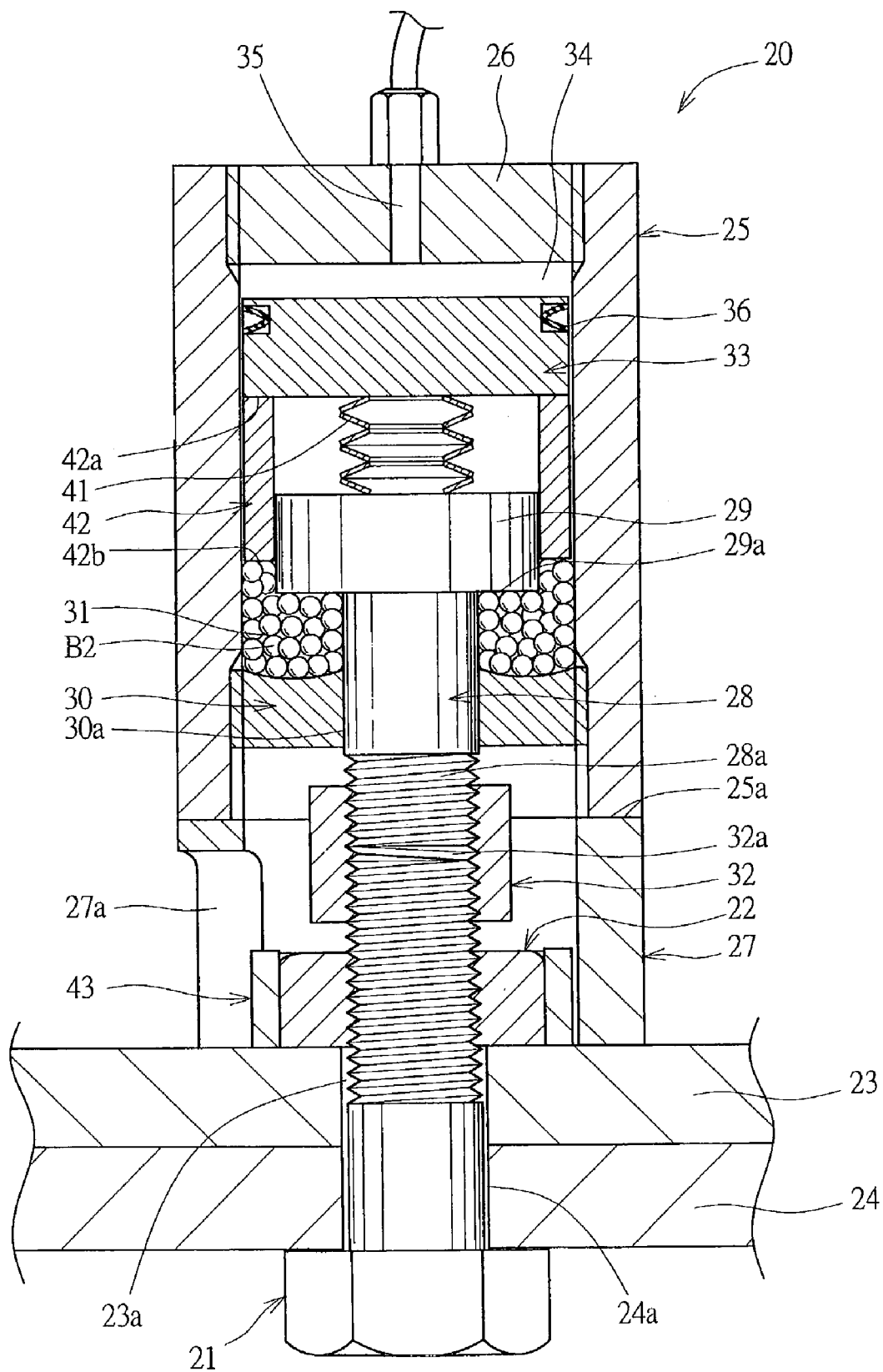
FIG. 4 is a cross-sectional view that shows an application state (prior to a fastening process) of the bolt tensioner shown in FIG. 3.
Figure 5:
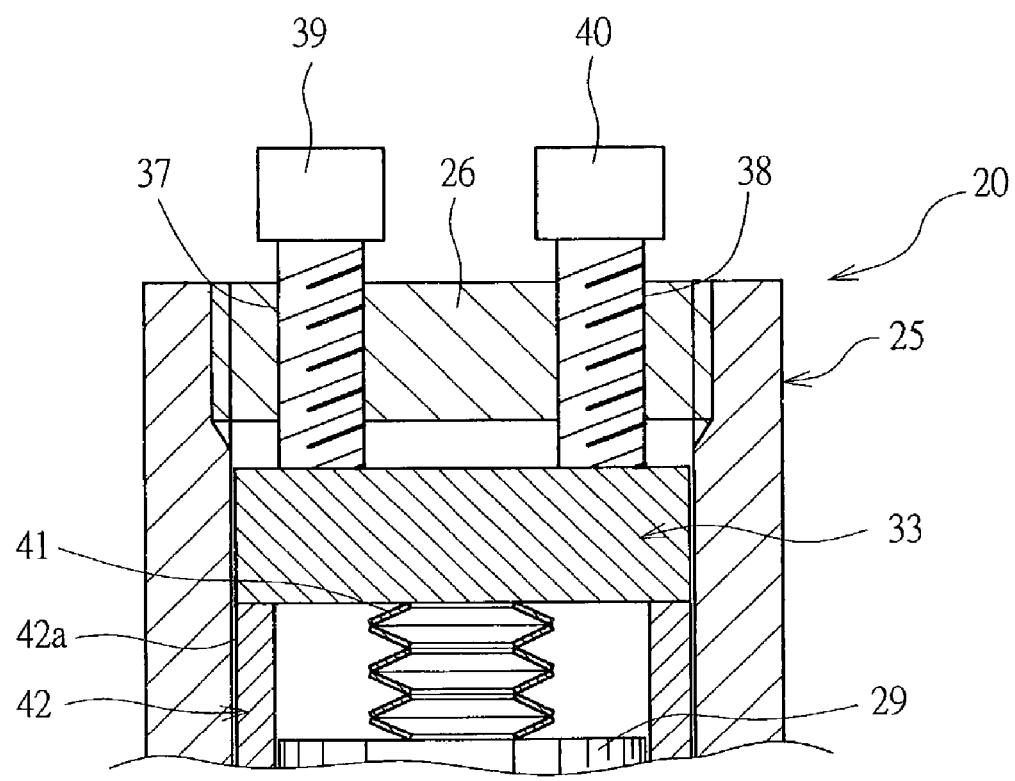
FIG. 5 is a cross-sectional view that shows another example of a load input to a load input piston shown in FIG. 4.
Figure 6:
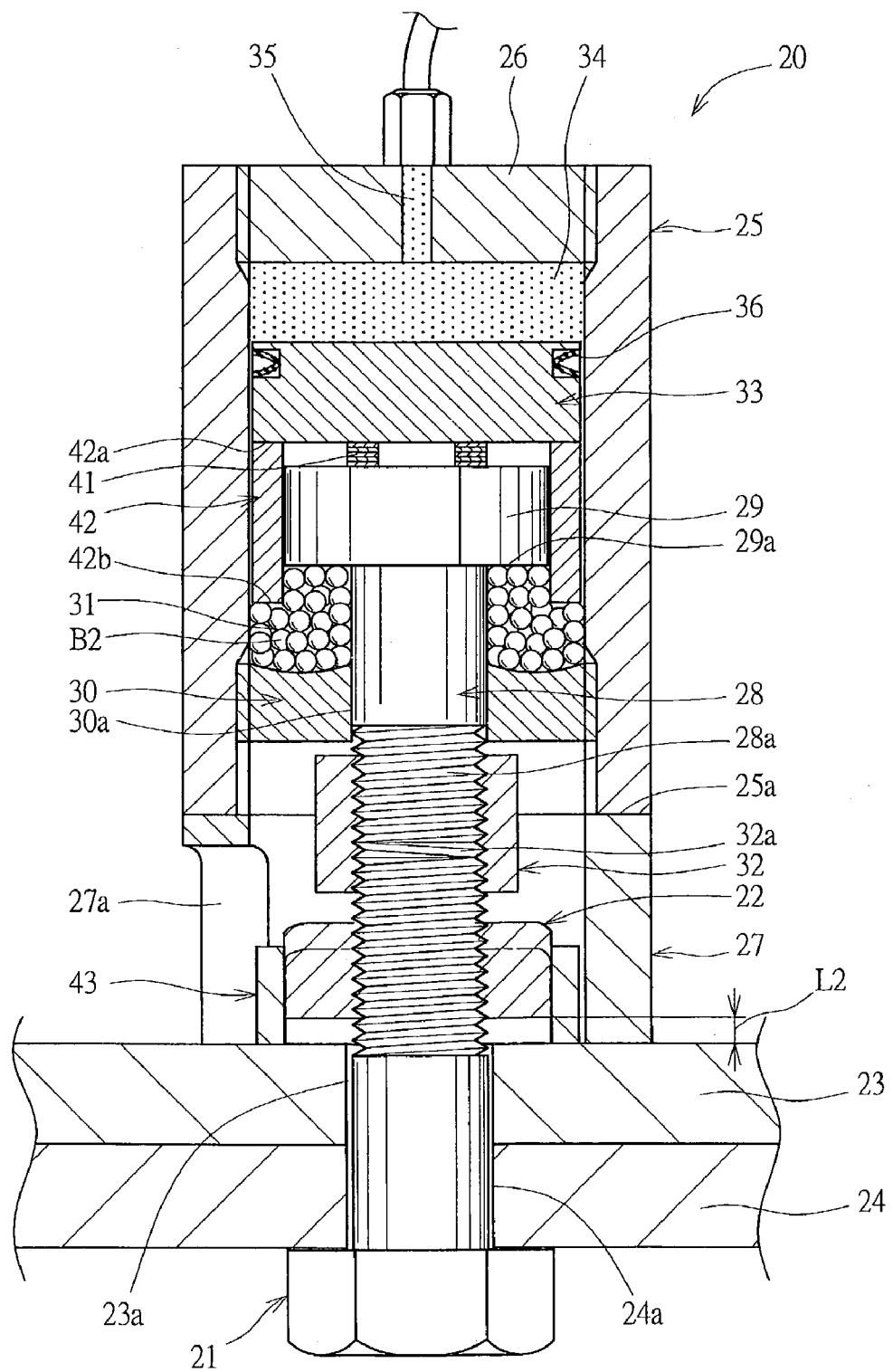
FIG. 6 is a cross-sectional view that shows an application state (after the fastening process) of the bolt tensioner shown in FIG. 3.

FIG. 3 is a perspective view that shows the external appearance of a bolt tensioner that relates to an embodiment of the present invention, and FIG. 4 is a cross-sectional view that shows an application state (prior to a fastening process) of the bolt tensioner shown in FIG. 3. Moreover, FIG. 5 is a cross-sectional view that shows another example of a load input to a load input piston shown in FIG. 4, and FIG. 6 is a cross-sectional view that shows an application state (after the fastening process) of the bolt tensioner shown in FIG. 3.

A bolt tensioner 20, which serves as this load-transmitting device, is arranged so that, when tightening the members to be fastened 23 and 24 by using a bolt 21 and a hexagonal nut 22, a load is preliminarily applied to the bolt 21 to generate an axial force in the bolt 21 after the fastening process so as to prevent the slackness of the fastening.

As shown in FIG. 3, the housing 25 of this bolt tensioner 20 is formed into a cylinder shape with a bottom with its upper end portion being closed by a lid member 26, and its opening end 25a facing downward in the drawing is placed on the member to be fastened 23. Moreover, a spacer 27 is placed between the housing 25 and the member to be fastened 23; thus, the spacer 27 makes it possible to adjust the gap between the housing 25 and the member to be fastened 23.

As shown in FIG. 4, a load-receiving piston 29 provided with a rod 28 on its axis center is installed in the housing 25 so as to be reciprocally movable in the axis direction. Moreover, a load-receiving cover 30 is secured to the opening end 25a side of the housing 25 so that a pressure chamber 31 is formed between the load-receiving piston 29 and the load-receiving cover 30.

The rod 28 is inserted through a through hole 30a formed in the load-receiving cover 30 secured to the housing 25, and aligned to face with the bolt 21 through this through hole 30a. A male screw portion 28a is formed on the top end side of the rod 28, and a bolt securing adapter 32 having a screw hole 32a is thread-engaged with the male screw portion 28a. This bolt securing adapter 32 is designed to be thread-engaged with the bolt 21 that has been inserted into through holes 23a and 24a of the members to be fastened 23 and 24 simultaneously so that the bolt 21 is detachably attached and connected to the rod 18 through the bolt securing adapter 32.

The pressure chamber 31 is filled with a number of balls B2 that serve as a pressure-transmitting medium made of spherical members. These balls B2 are made of steel, and these balls B2, which serve as rigid spherical bodies, have fluidity in the pressure chamber 31.

In this manner, in the bolt tensioner 20 of the present invention, since the pressure-transmitting medium to be injected into the pressure chamber 31 is prepared as a number of balls B2, it is possible to obtain the same effects as those of the case of the nut 1 such as a reduction in the costs of the bolt tensioner 20 obtained by eliminating the necessity of the sealing members in the pressure chamber 31.

A load-input piston 33 is coaxially attached to the load-receiving piston 29 inside the housing 25 at a position adjacent to the upper side in the drawing. The load input piston 33 is formed into a disc-shape that is allowed to slide on the inner circumferential face of the housing 25 so as to be reciprocally movable in the axis direction, and an input cylinder chamber 34 is formed between it and a lid member 26.

A hydraulic port 35 through which an oil pressure is supplied from a hydraulic pump (not shown) is attached to the lid member 26, and a hydraulic pressure is transmitted to the inside of the input cylinder 34 through this hydraulic port 35. Moreover, a sealing member 36 is attached to the outer circumferential face of the load input piston 33 so that it is possible to prevent the hydraulic pressure to be applied to the input cylinder chamber 34 from leaking through the sliding portion between the inner circumferential face of the housing 25 and the load input piston 33. Thus, by applying a hydraulic pressure to the input cylinder chamber 34, a load is applied to the load input piston 33. Here, in this embodiment, the load input piston 33 is designed to receive a load given by a hydraulic pressure supplied to the input cylinder chamber 34. However, it is not limited to this arrangement, and a load may be applied to the load input piston 33 as shown in FIG. 5 by screwing input bolts 39 and 40 serving as jack screws to be thread-engaged with the input screw holes 37 and 38 formed in the lid member 26 toward the load input piston 33.

A plurality of conical disc springs 41 are placed between the load-receiving piston 29 and the load input piston 33 so that a spring force is applied in a direction that the load-receiving piston 29 and the load input piston 33 are separated from each other.

A load-transmitting member 42 having a cylinder shape is attached to a gap between the load input piston 33 and the pressure chamber 31. This load-transmitting member 42, which has its outer circumferential face in sliding-contact with the inner circumferential face of the housing 25 and its inner circumferential face made in sliding-contact with the outer circumferential face of the load-receiving piston 29, is allowed to be reciprocally movable in the axis direction, with one of its end faces 42a being made in contact with the load input piston 33 and the other end face 42b being exposed to the inside of the pressure chamber 31. Thus, a load applied to the load input piston 33 is transmitted to the balls B2 inside the pressure chamber 31 through this load-transmitting member 42. Moreover, the area of the end face 42b of this load-transmitting member 42 that transmits a load to the balls B2, that is, a pressure receiving area A1 is set to be smaller than the area of the end face 29a through which the load-receiving piston 29 receives the load from the balls B2, that is, a load-receiving area A2.

The surfaces of the balls B2 and the inner surfaces of the pressure chamber 31 that are made in contact with the balls B2, that is, the surfaces of the housing 25, the rod 28, the load-receiving piston 29, the load-receiving cover 30 and load-transmitting member 42 that constitute the pressure chamber 31 have been thermally treated through a carburization quenching process or a nitriding method so that the surface hardness is increased to improve the sliding property and abrasion resistance between the balls B2 and the pressure chamber 31. Moreover, grease is applied to the surfaces of the balls B2 so that the surfaces are lubricated. Here, in this embodiment, the pressure-transmitting medium to be injected into the pressure chamber 31 is prepared as a number of balls B2. However, it is not limited to this arrangement, and hydraulic oil may be used. In this case, seal members for preventing the leakage of the hydraulic oil are placed at gaps among the respective members that constitute the pressure chamber 31.

The spacer 27 is used for adjusting the gap between the rod 28 and the bolt 21. In other words, a spacer that is suitable for the length of the bolt 21 to be used is selected from the prepared spacers 27 having different height dimensions, and applied. Moreover, a window section 27a is formed in the spacer 27, and through this window section 27a, an attaching process of the bolt 21 to the bolt securing adapter 32, a tightening process of the hexagonal nut 22 and the like are carried out. Moreover, in this case, a nut adaptor 43 is fitted to the hexagonal nut 22 so as to make the tightening process of the hexagonal nut 22 easier. This nut adaptor 43 is provided with an engaging hole 43a that is engaged with a handle (not shown) and formed in the outer circumferential face thereof, and thus, the hexagonal nut 22 is rotated by this handle.

Next, the operations of the bolt tensioner 20 as described above will be described.

First, a hexagonal nut 22 is thread-engaged with the bolt 21 that is inserted into the through holes 23a and 24a formed in the members to be fastened 23 and 24, and tightened. Then, the nut adaptor 43 is fitted to the hexagonal nut 22, and the bolt tensioner 20 is placed on the top portion thereof.

Then, the bolt securing adaptor 32 is rotated through the window section 27a so as to couple the bolt 21 and the rod 28. Further, a hydraulic pressure is applied to the input cylinder chamber 34 from the hydraulic pump (not shown) so as to apply a load in the downward direction in the drawing to the load input piston 33. Consequently, as shown in FIG. 5, the load-transmitting member 42 is moved downward in the drawing along with the load input piston 44, and the balls B2 housed inside the pressure chamber 31 receive the load from the load-transmitting member 42. Thus, this load is transmitted to the load-receiving piston 29 through these balls B2. At this time, the working directions of the load-transmitting member 42 and the load-receiving piston 29 are reversed to each other. However, since the shape on the pressure chamber 31 side of the load-receiving cover 30 is set to a concave shape, the balls B2 are allowed to smoothly move.

In this manner, the load applied to the load input piston 33 is transmitted to the load-receiving piston 29 through the load-transmitting member 42 and the balls B2 so that the load-receiving piston 29, that is, the rod 28 is moved upward in the drawing by the load applied to the balls B2 so as to apply a tensile force in the axis direction to the bolt 21. At this time, since the pressure-receiving area A1 of the load-transmitting member 42 is set to be smaller than the pressure-receiving area A2 of the load-receiving piston 29, the applied load to the load-transmitting member 42 is multiplied in proportion to the ratio of the pressure-receiving areas, that is, A2/A1 times the applied load, and transmitted to the load-receiving piston 29. In addition, since the load input piston 33 is formed into a disc-shape that is made in sliding-contact with the inner circumferential face of the housing 25 and has a greater ratio of the pressure-receiving area relative to the cross-section of the housing 25, it is possible to output a desired tensile force to the bolt 21 even when the outer diameter of the bolt tensioner 20 is made smaller. Therefore, it becomes possible to achieve the size and weight reduction of this bolt tensioner 20.

The bolt 21 is extended in the axis direction by the applied tensile force and a gap L2 is created between the member to be fastened 23 and the hexagonal nut 22 as shown in FIG. 5. In this state, the hexagonal nut 22 can be freely rotated, and when the hexagonal nut 22 is again tightened onto the member to be fastened 23 as indicated by the chain line in the drawing by inserting a handle through the window section 27a, the gap L2 between the member to be fastened 23 and the hexagonal nut 22 is eliminated, and the hexagonal nut 22 is made in contact with the member to be fastened 23.

Next, in the case when the tensile force, which has been applied to the bolt 21, is released in this state by discharging the hydraulic pressure applied to the inside of the input cylinder chamber 34, since the bolt 21 is allowed to shrink in the axis direction, the hexagonal nut 22 and the bolt 21 are fastened to each other, with an axial force being applied to the bolt 21. The axial force of the bolt 21 allows the hexagonal nut 22 to tightly contact the member to be fastened 23, and thereby preventing the slackness of the fastening.

In contrast, when the hexagonal nut 22 in the fastened state is loosened, a tensile force which is slightly greater than the axial force of the bolt 21 in the tightened state is applied to the bolt 21 by using the bolt tensioner 20. Consequently, a gap is created between the hexagonal nut 22 and the member to be fastened 23 and the hexagonal nut 22 can be freely rotated, that is, can be rotated in the loosening direction.

Figure 7:
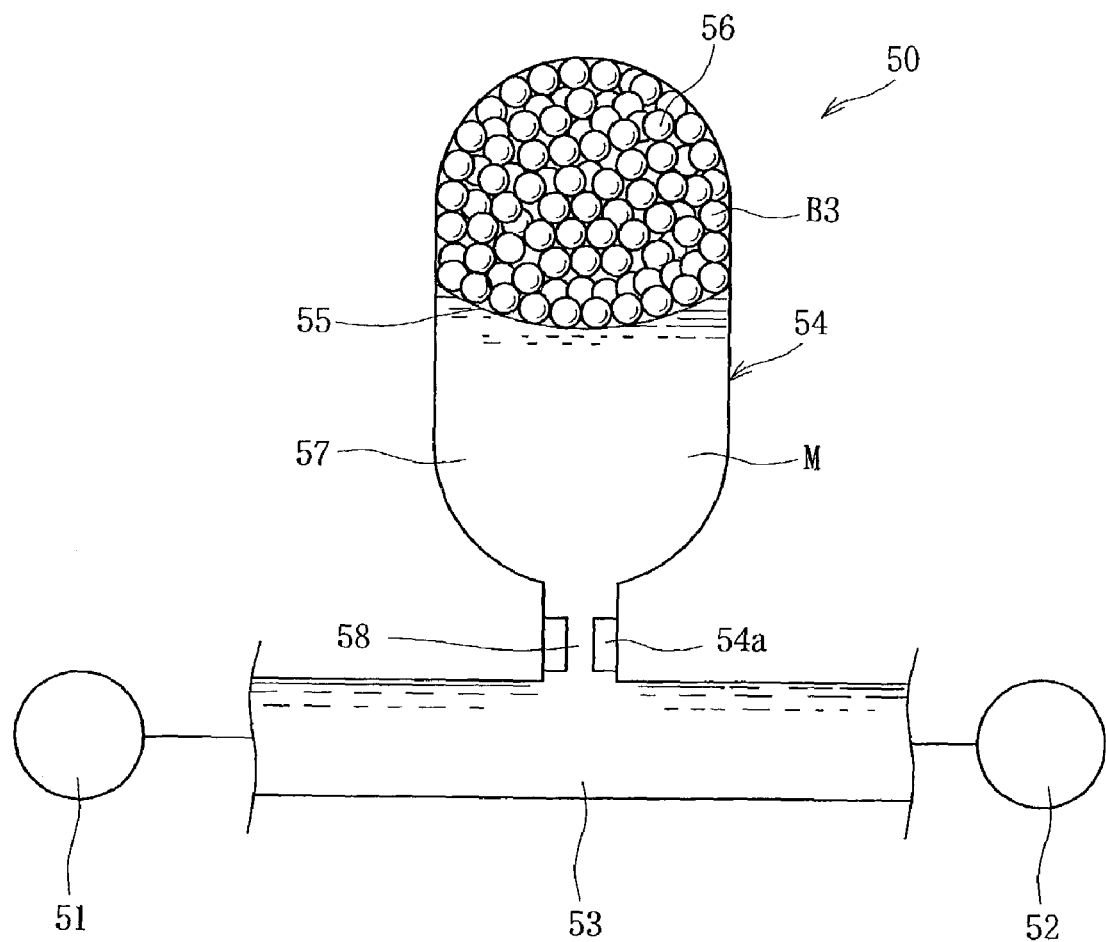
FIG. 7 is an explanatory drawing that schematically shows an accumulator according to an embodiment of the present invention.
Figure 8:
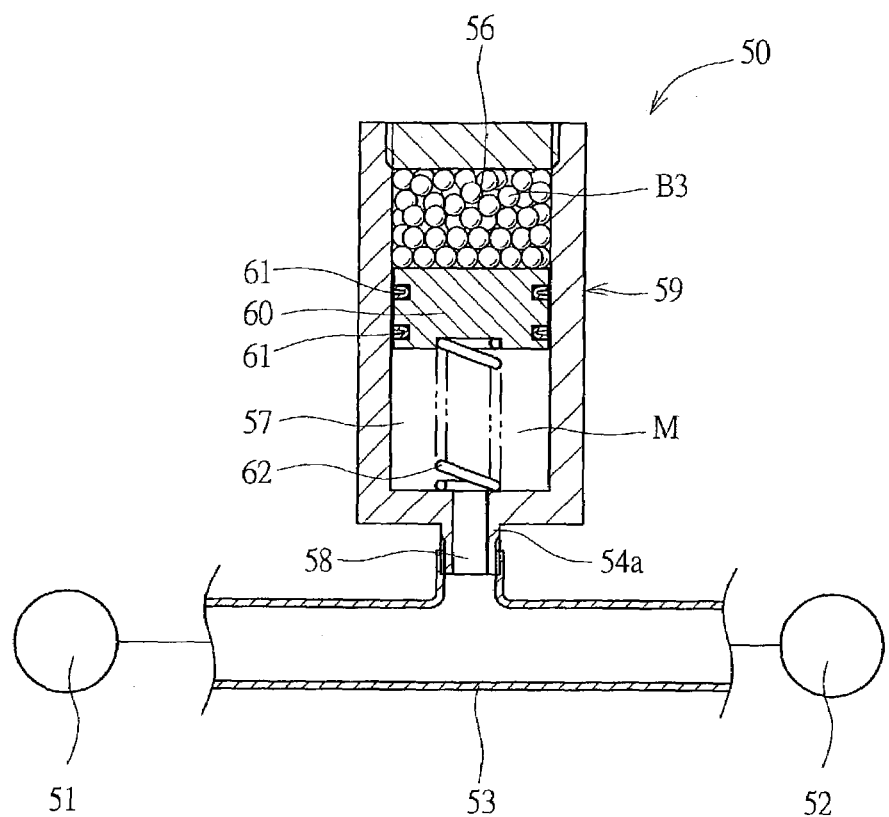
FIG. 8 is a cross-sectional view that shows a modified example of the accumulator shown in FIG. 7.

FIG. 7 is an explanatory drawing that schematically shows an accumulator according to an embodiment of the present invention, and FIG. 8 is a cross-sectional view that shows a modified example of the accumulator shown in FIG. 7. Here, in FIG. 8, those members that correspond to the above-mentioned members are denoted by the same reference numerals.

This accumulator 50, which is connected to a hydraulic pipe 53 that connects the hydraulic pump 51 for generating a hydraulic pressure to a hydraulic apparatus 52 that is operated by this hydraulic pressure, is used for absorbing pulse movements of the hydraulic pressure generated by the hydraulic pump 51.

As shown in FIG. 7, the accumulator 50 is provided with a housing 54 serving as the first load-receiving member formed into a hollow cocoon shape, and this housing 54 is connected to the hydraulic pipe 53 at a connecting section 54a. A bladder 55, which serves as the second load-receiving member made of an elastic material, is assembled in the housing 54. The bladder 55, which has its outer circumferential portion secured to the inner circumferential face of the housing 54 so as to form a pressure chamber 56 as a compartment inside the housing 54, is elastically deformed to be movable relative to the housing 54. In other words, the pressure chamber 56 is allowed to change its capacity by the elastic deformation of the bladder 55.

A number of balls B3, which serve as a pressure-transmitting medium and are made of a spherical member, are injected in the pressure chamber 56. These balls B3 serving as elastic spherical bodies are made of an elastic material such as rubber and plastic and these are elastically deformed by a load to be applied to the pressure chamber 56.

An oil chamber 57, which is adjacent to the pressure chamber 56 through the bladder 55, is formed in the housing 54 and the oil chamber 57 is allowed to communicate with the hydraulic pipe 53 through a flow inlet 58 attached to the connecting section 54a. In other words, a hydraulic pressure generated by hydraulic oil M supplied from the hydraulic pump 51 is applied to the oil chamber 57.

The operation of the accumulator 50 as described above will be described.

When the hydraulic pump 51 is operated to generate a hydraulic pressure in the hydraulic oil M in the hydraulic pipe 53, the hydraulic pressure is applied to the oil chamber 57 of the accumulator 50 through the flow inlet 58. Then, the bladder 55 is elastically deformed in a direction that the capacity of the pressure chamber 56 is reduced by the hydraulic pressure of the hydraulic oil M serving as the load input member, more specifically, by the load, and thus, the load is applied to the balls B3. Then, the balls B3 loaded in the pressure chamber 56 are allowed to transmit the applied load to the housing 54 and the bladder 55, and elastically deformed. In other words, the bladder 55 and the balls B3 are elastically deformed to a state in which the load applied from the hydraulic oil M through the bladder 55 has come to balance the elastic force of the balls B3, thereby accumulating the energy of the hydraulic oil as elastic energy of the balls B3. Moreover, in the case when pulse movements occur in the hydraulic pressure in the hydraulic pipe 53 by the operation of the hydraulic pump 51, the amount of elastic deformation of the bladder 55 and the balls B3 is changed in accordance with the pulse movements and the pulse movements of the hydraulic pressure is absorbed.

As described above, since the pressure-transmitting medium to be injected into the pressure chamber 56 of the accumulator 50 is prepared as balls B3 made of an elastic material, it becomes possible to eliminate the necessity of the sealing member for preventing the leakage of the pressure-transmitting medium from the pressure chamber 56, and consequently to reduce the costs of the accumulator 50.

Moreover, since it become possible to eliminate the necessity of injecting high-pressure nitrogen gas or the like as the pressure-transmitting medium into the pressure chamber 56, the versatility of the accumulator 50 can be improved by reducing the use conditions such as the injection work.

Additionally, in this embodiment, the pressure chamber 56 of the accumulator 50 is formed as a compartment by using the housing 54 formed into a cocoon shape and the elastically deformable bladder 55 that is secured to the inside of the housing 54. However, it is not limited to this arrangement, and as shown in FIG. 8, another arrangement may be proposed in which a housing 59 that is formed into a cylinder shape to serve as the first load-receiving member and a piston 60 that is attached to the inside of the housing 59 so as to be reciprocally movable in the axis direction and serves as the second load-receiving member are installed so that the pressure chamber 56 is formed as a compartment in the housing 59. In this case, a sealing member 61 is placed at a sliding portion between the housing 59 and the piston 60, and the piston 60 is allowed to preliminarily apply a pressure to the balls B3 loaded into the pressure chamber 56 by using a spring 62 installed in the oil chamber 57 to prevent deviations in the balls B3.

It is to be understood that the present invention is not limited to the above-mentioned embodiments, and various modifications may of course be made within the scope of the present invention. For example, in the embodiments, the nut 1, the bolt tensioner 20 and the accumulator 50 are used as the load-transmitting device. However, it is not limited to this arrangement, and another load-transmitting device may be used as long as it includes a pressure chamber that is formed as a compartment by a first load-receiving member and a second load-receiving member and a load applying member to apply a load to a pressure-transmitting member constituted of spherical members loaded into this pressure chamber and the load applied to the pressure-transmitting medium is transmitted to the first and second load-receiving members through the pressure-transmitting medium.

Figure 9:
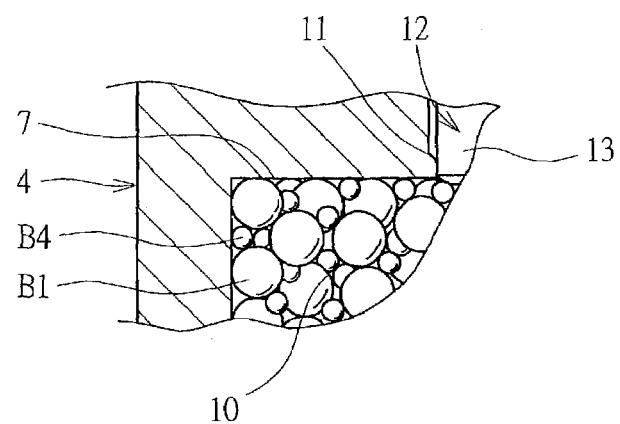
FIG. 9 is a cross-sectional view that shows a modified example of balls to be injected into a pressure chamber.

Moreover, in the embodiments, each of the balls B1, B2 and B3 is formed to have a single radius having an optimal size by taking the balance between the solid strength and predetermined transmitting force into consideration. However, it is not limited to this arrangement, for example, as indicated by the method applied to a nut 1 of FIG. 9, balls B4 having a smaller radius may be mixed, within a range that would not impair the fluidity. With this arrangement, the balls B1 having a greater radius make the ball density in the pressure chamber 10 smaller to increase the degree of freedom in the ball movements to improve the mutual fluidity, and the balls B4 having a smaller radius reduce the contact compression stress imposed on each ball. Consequently, deviations in the press-contacting force exerted between the balls are reduced, and thus, it becomes possible to improve the load-transmitting efficiency in the load-transmitting device.

Moreover, in the embodiments, the balls B1 and B2 are made of a steel material, and the balls B3 are made from an elastic material such as rubber and plastic. However, it is not limited to this arrangement, and these may be made from other materials such as ceramics. In particular, in the case when the balls are formed as rigid spherical bodies made of a steel material, elastic spherical bodies made from an elastic material may be mixed in addition to these rigid spherical bodies. In this case, even when there are impacts and pulse movements from the load-applying means, these impacts and vibration may be absorbed to allow the load-receiving members to move more smoothly, and uneven active forces that locally occur between the balls can be absorbed earlier to achieve an even pressure-transmitting property in the ball aggregate as a whole. Therefore, it becomes possible to improve the load-transmitting efficiency in the load transmission device. Furthermore, in the case when the nut 1 is used without loosening the input bolt 12 after the fastening process, the elastic force of these elastic spherical bodies has a function for absorbing the vibration, impact and the like to be imposed on the nut 1, that is, a so-called spring washer function. As a result, it is possible to prevent the slackness of the fastening. Of course, the elastic limit strength and breaking strength of these elastic spherical bodies have to be set to withstand the load to be transmitted thereto. Moreover, in the case when, depending on the purposes of use, it is more important to disperse active forces quickly by using the balls serving as the pressure-transmitting medium than to prevent vibration, it is more desirable to intentionally apply pulse movements to the pressure-applying source so as to reduce the frictional resistance between the balls. This is intended that the residual frictional force and centripetal force on the ball surface are instantaneously changed by applying a pressure with pulse movements and thus the balls are allowed to easily shift the position by the slide or the rotation, and thereby improving the evenness of the active force distribution density. In the case when it is difficult to generate effective pulse movements in the load-applying means, the equivalent effects can be obtained by directly applying the intermittent light impacts or vibration mechanically to the peripheral portion of the pressure chamber of the device by using a hummer or the like.

Moreover, in the embodiments, no sealing members are placed between the members constituting the pressure chamber; however, in order to prevent the balls from being locally deformed due to contact with the peripheral portion of the gap between these members, a gap protective ring made of a hard material such as metal or carbide may be placed at each of the sliding portions between the respective load-receiving members.

Figure 10:
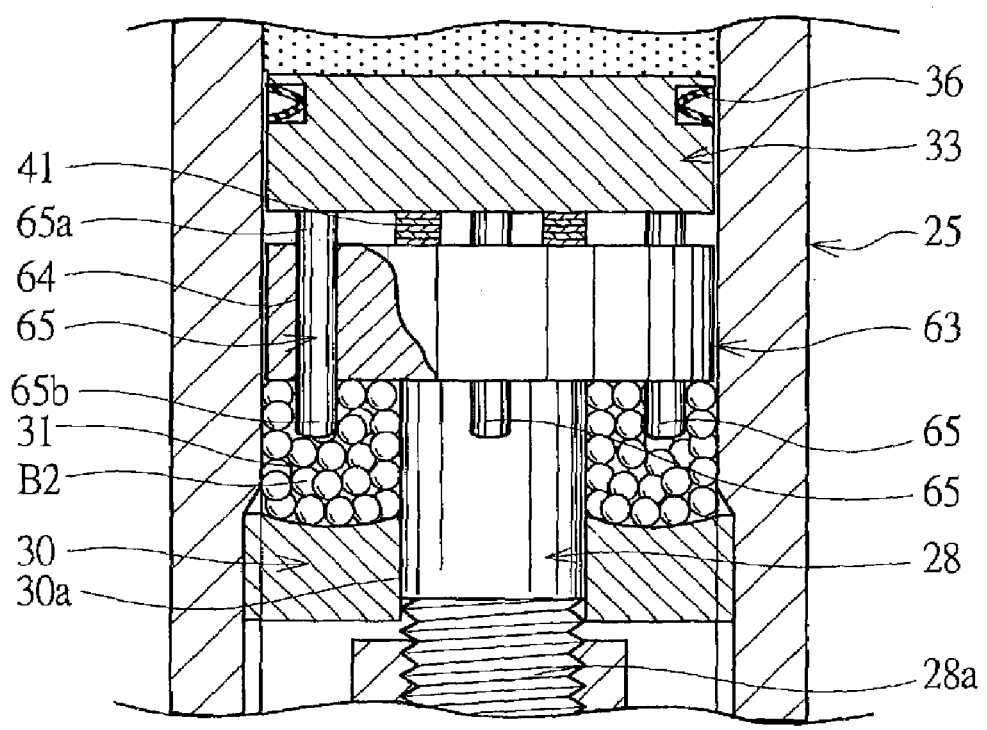
FIG. 10 is a cross-sectional view that shows a modified example of the load-transmitting member shown in FIG. 3.

Furthermore, in the embodiments, the load-transmitting member 42 is formed into a cylinder shape that is made in sliding-contact with the inner circumferential face of the housing 25 and the outer circumferential face of the piston 29. However, it is not limited to this arrangement, for example, as shown in FIG. 10, a plurality of rod members 65 (four in the case of the drawing) may be used, which are inserted into through holes 64 formed in the load-receiving piston 63 so as to be slidable in the axis direction, the load-receiving piston 63 being formed into a disc shape that is made in sliding-contact with the inner circumferential face of the housing 25. In this case, the rod-shaped members 65 receive a load from the load input piston 33 at base portions 65a shown on the upper side of the drawing, and transmit the load to the balls B2 at the top portions 65b shown on the lower side of the drawing.

Moreover, in the embodiments, with respect to the nut 1, the input bolt 12 serving as the load-applying means is placed on the first load-receiving member 4. However, it is not limited to this arrangement, and as shown in a nut 70 serving as a load transmission device shown in FIG. 11, an input bolt 71 serving as a load-applying means may be placed on the second load-receiving member 73. Moreover, in the same manner as this nut 70, in addition to the input bolt 71, a ring-shaped load-input piston 74, which is made in sliding-contact with the inner circumferential face 73a of the second load-receiving member 73 so as to be reciprocally movable in the axis direction, and a cylinder-shaped load-transmitting member 75, which is inserted between the load-input piston 74 and the pressure chamber 10, may be installed as the load-applying means. In this case, the input bolt 71 is thread-engaged with the input screw hole 76 that is formed in the lid portion 73b of the second load-receiving member 73. Here, by screwing the input bolt 71, a load is applied to the load-input piston 74 downward in the drawing and the load-transmitting member 75 is moved downward in the drawing together with the load-input piston 74, thereby applying a load to the balls B1 housed in the pressure chamber 10. Moreover, the area of the end face 75a of the load-transmitting member 75, that is, the pressure-receiving area A3 is set to be smaller than the area of the end face 77a of the first load-receiving member 77, that is, the pressure-receiving area A4 and a force-multiplying structure similar to the bolt tensioner 20 shown in FIG. 5 is obtained. Therefore, the applied load to the load-transmitting member 75 is multiplied in proportion to the pressure-receiving area ratio, that is, A4/A3 times the applied load, and then, transmitted to the first load-receiving member 77. Here, also in the nut 70, in the same manner as the bolt tensioner 20 shown in FIG. 4, an oil pressure may be supplied between the load input piston 74 and the lid portion 73b of the second load-receiving member 73 in place of the input bolt 71 so as to apply a load to the load input piston 74. Moreover, in place of the load-transmitting member 75, the rod members as shown in FIG. 10 may be used. In this case, each of the rod members is inserted into the through hole formed in the first load-receiving member 77 so as to be slidable in the axis direction.

Figure 11:
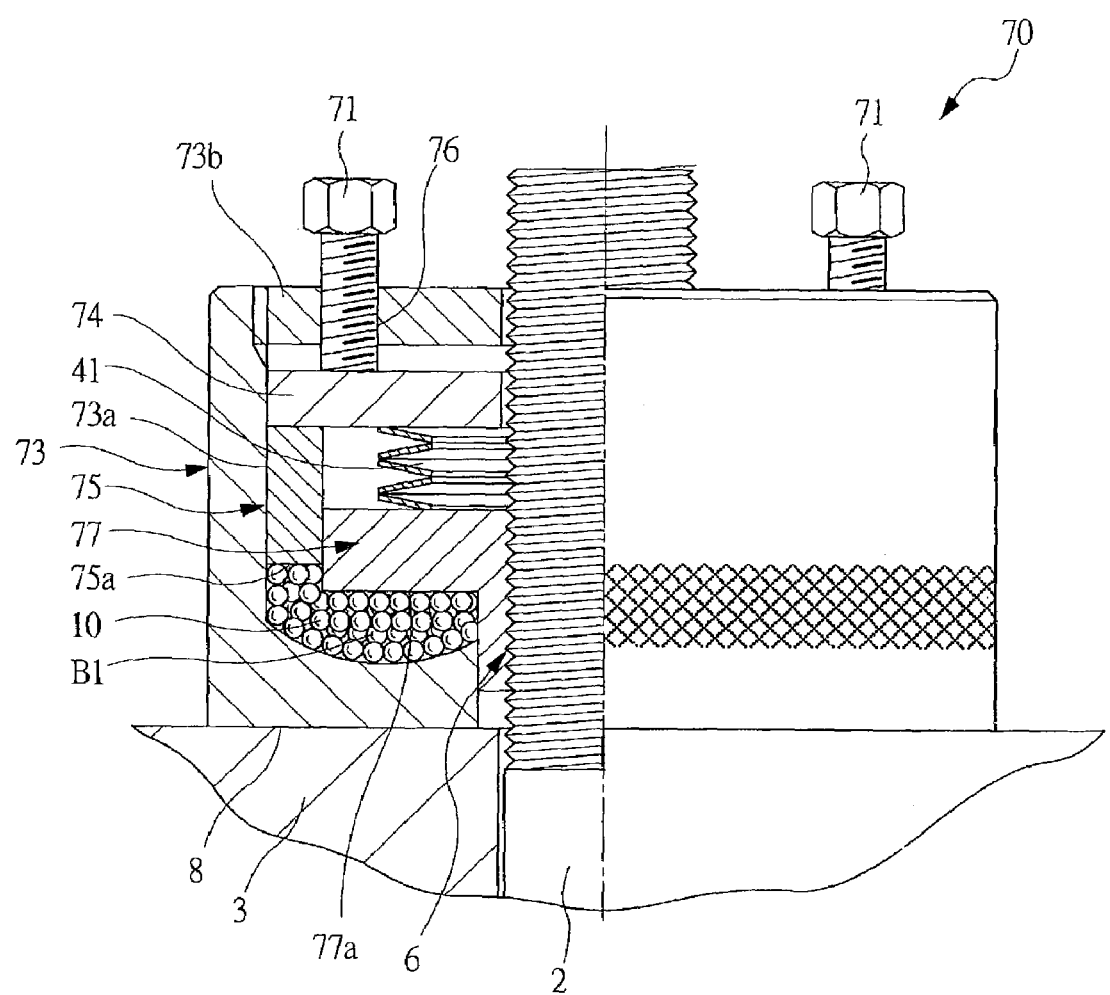
FIG. 11 is a cross-sectional view that shows a modified example of the nut shown in FIG. 1.
Figure 12:
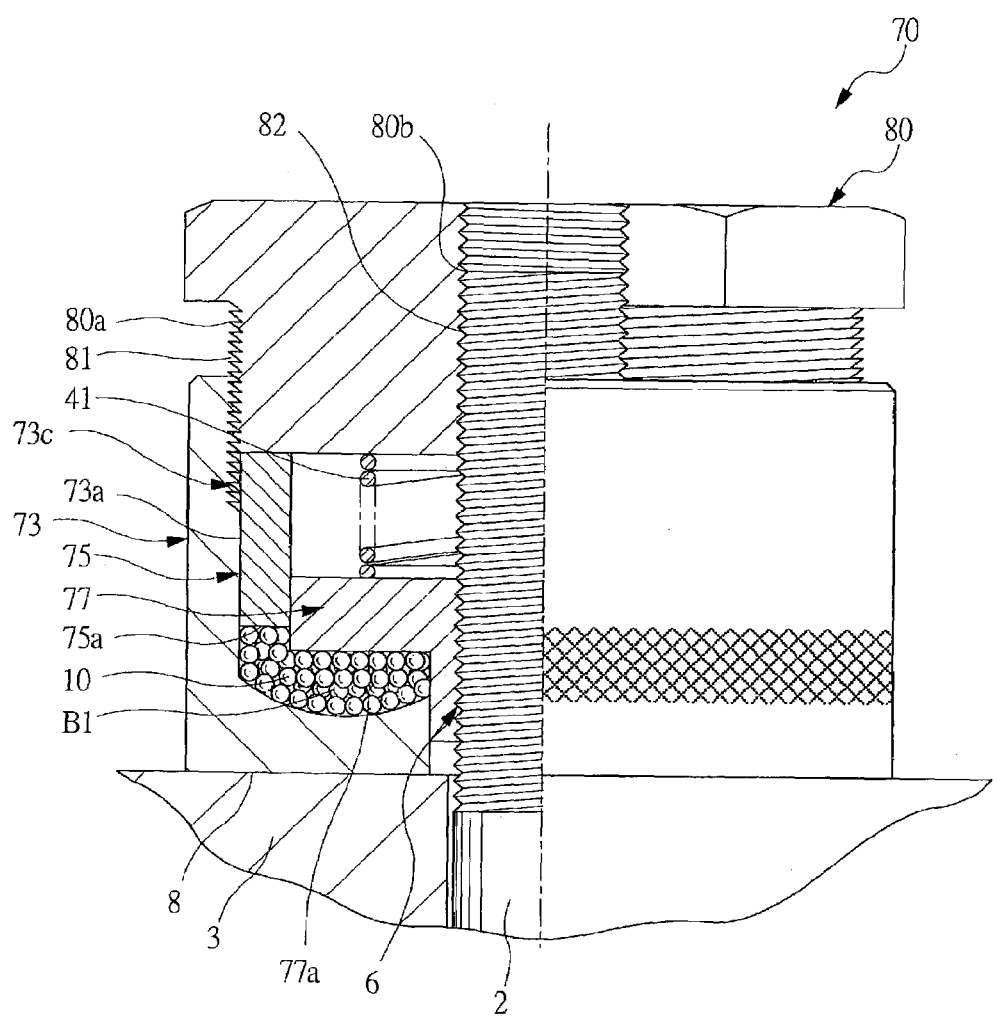
FIG. 12 is a cross-sectional view showing a modified example of the nut shown in FIG. 1, in which the nut is formed as a rotary nut.

Moreover, as shown in FIG. 12, a rotary nut 80 may be used as the fastening screw member in place of the load input piston 74 shown in FIG. 11. In this case, the rotary nut 80 is formed into a cylinder shape and a large-diameter male screw portion 81, which is thread-engaged with a large-diameter female screw portion 73c formed on the inner circumferential face 73a of the second load-receiving member 73, is formed on the outer circumferential face 80a of the rotary nut 80. Thus, by screwing the rotary nut 80 into the large-diameter female screw portion 73c, a load is applied to the balls B1 through the load-transmitting member 75. Moreover, a small-diameter female screw portion 82 having a lead S1 serving as a first lead corresponding to the lead of the bolt 2 is formed in the inner circumferential face 80b of this rotary nut 80, and the rotary nut 80 is thread-engaged with the bolt 2 in the small-diameter female screw portion 82. Therefore, by screwing the rotary nut 80, the small-diameter screw portion 82 is allowed to apply a tensile force to the bolt 2. Here, the small-diameter female screw portion 82 and the large-diameter male screw portion 81 are the screws having the same direction, and the lead S1 of the small-diameter female screw portion 82 and the lead S2 serving as the second lead of the large-diameter male screw portion 81 are arranged so that the lead S1 of the small-diameter female screw portion 82 is greater than the lead S2 of the large-diameter male screw portion 81 so as to satisfy the following relationship with respect to the pressure-receiving area A3 of the load-transmitting member 75 and the pressure-receiving area A4 of the first load-receiving member 77:

$$A3/A4 \leq (S2-S1)/S1.$$

In other words, it is designed that the tensile force transmitted to the bolt 2 through the load-transmitting member 75 and the balls B1 is made synchronous to the tensile force applied to the bolt 2 through the small-diameter female screw portion 82 or that the tensile force applied to the bolt 2 through the small-diameter female screw portion 82 exceeds the tensile force transmitted to the bolt 2 through the load-transmitting member 75 and the balls B1. For this reason, the tensile strength applied to the bolt 2 through the rotation of the rotary nut 80 is applied in a separated manner from the first load-receiving member 77 and from the small-diameter screw portion 82 of the rotary nut 80. Therefore, it becomes possible to reduce the load imposed on the ball B1 and consequently to ensure the operation of the nut 70 more positively.

Moreover, in the embodiments, the bolt tensioner 20 shown in FIG. 4 is detachably connected to the bolt 21 in the rod 28. However, it is not limited to this arrangement, and as indicated by a bolt tensioner 90 serving as a load-transmission device shown in FIG. 13, the load-receiving piston 29 may be integrally formed with a bolt, that is, a rod 91 as it may be used as the bolt. In this case, a housing 92 is formed to have a short length to allow the load-receiving cover 30 to contact the member to be fastened 23, and the rod 91 is protruded from the through hole 30a of the load-receiving cover 30. Moreover, the rod 91 is inserted into the through holes 23a and 24a of the members to be fastened 23 and 24 so that a male screw portion 91a is allowed to protrude to the side of the member to be fastened 24, and a hexagonal nut 22 is thread-engaged with the protruded male screw portion 91a. When a hydraulic pressure is applied to the input cylinder chamber 34 with the hexagonal nut 22 being thread-engaged with the female screw portion 91a, a tensile force is applied to the rod 91 through the load input piston 33, the load-transmitting member 42, the balls B2 and the load-receiving piston 29, and the tightening face of the hexagonal nut 22 is made tightly in contact with the member to be fastened 24, thereby preventing the slackness of the fastening.

Figure 13:
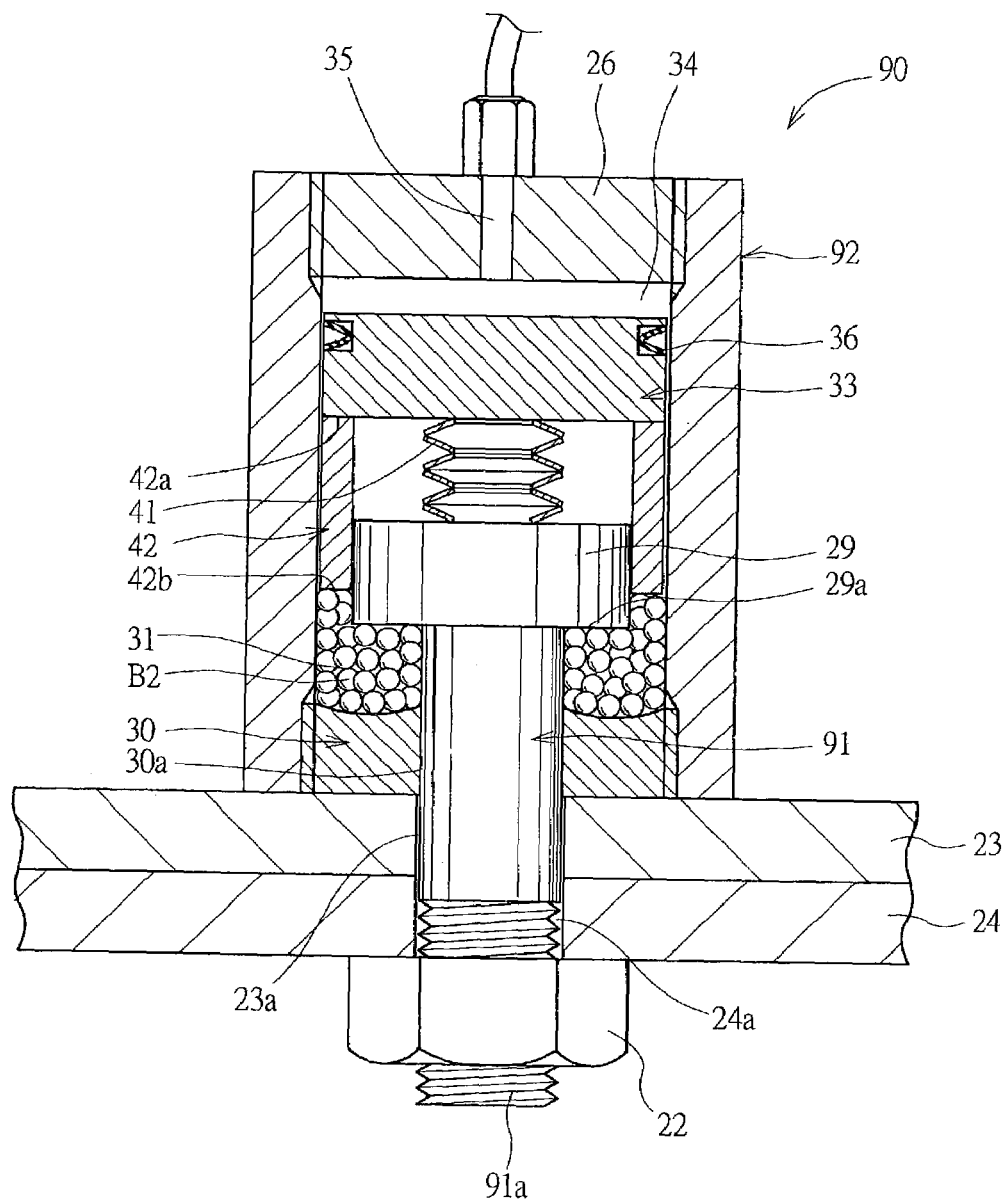
FIG. 13 is a cross-sectional view that shows a modified example of the bolt tensioner shown in FIG. 3.

In FIGS. 11, 12 and 13, those members that are the same as those described above are denoted by the same reference numerals.

According to the present invention, the pressure-transmitting medium that is injected in the pressure chamber formed as a compartment between the first load-receiving member and the second load-receiving member is prepared as the spherical members the surface of which is lubricated. Therefore, it becomes possible to eliminate the necessity of sealing members used for preventing the leakage of the pressure-transmitting medium from the pressure chamber, and consequently to reduce the costs of this load transmission device. Moreover, since it is possible to prevent a load to be applied to the pressure transmitting medium from being limited by the characteristic of the seal member, the size and weight reduction in the load-transmitting device can be achieved by setting the transmitted load in the pressure chamber to a higher value. Moreover, since the pressure-transmitting medium is prepared as the spherical members, it is possible to prevent the pressure-transmitting medium from being limited by the use conditions, and since it is possible to prevent the pressure-transmitting medium from leaking from the pressure chamber, it becomes possible to adapt the load transmission device to wide installation environments, and consequently to improve the versatility of the device.

Moreover, according to the present invention, since the inner surface of the pressure chamber that is made in contact with the spherical members and the spherical members are made of steel that has been subjected to a thermal treatment, it is possible to improve the load-transmitting efficiency in the load-transmitting member.

Furthermore, according to the present invention, since the spherical members include the rigid spherical bodies and the elastic spherical bodies, it is possible to absorb vibration and the like applied to the pressure chamber, and also to improve the load-transmission efficiency in the load transmission device by equalizing the loads exerted among the spherical members.

According to the present invention, since the spherical members include a plurality of kinds of members having respectively different diameters, it is possible to improve the load-transmission efficiency in the load transmission device.

Moreover, according to the present invention, since the load input piston is formed into a disc shape that is in sliding-contact with the inner circumferential face of the housing, and since the pressure-receiving area of the load-transmitting members is set to be smaller than the pressure-receiving area of the load-receiving piston, it is possible to achieve the size and weight reduction of the load transmission device.

Furthermore, according to the present invention, the load-applying means is provided with: a fastening screw member, in which a small-diameter female screw portion, which has a first lead corresponding to a lead of the bolt and is thread-engaged with the bolt, is formed in the inner circumferential face of the fastening screw member and a large-diameter male screw portion, which has a second lead smaller than the first lead and is thread-engaged with a large-diameter female screw portion formed in the second load-receiving member with the same direction as the small-diameter female screw portion, is formed on the outer circumferential face of the fastening screw member. Therefore, the tensile force to be applied to the bolt is applied in a separated manner from the first load-receiving member and from the small-diameter screw portion, and thus, it is possible to reduce the load imposed on the spherical members and consequently to ensure the operation of the load-transmitting members more positively.

What is claimed is:

1. A load transmission device, comprising:
a first load-receiving member;
a second load-receiving member that is assembled to said first load-receiving member so as to be relatively movable to form a pressure chamber as a compartment together with said first load-receiving member;
a pressure-transmitting medium that is injected into said pressure chamber and comprised of spherical members the surface of which is lubricated;
load-applying means which is installed in at least one of the first and second load receiving members, and applies a load onto said pressure-transmitting medium;
wherein a load applied onto said pressure-transmitting medium is transmitted to said first and second load-receiving members through said pressure-transmitting medium;
a screw hole is provided in said first load-receiving member through which hole a bolt for fastening a member to be fastened is thread-engaged;
said second load-receiving member is placed to said member to be fastened; and
a load in the tensile direction is preliminarily applied to said bolt by said pressure-transmitting medium through said first load-receiving member.

2. The load transmission device according to claim 1 further comprising:
a lock member for supporting the load of the first load-receiving member, which has a female screw portion that is thread-engaged with a male screw portion that is placed on the outer circumferential face of either one of the first and second load-receiving members and a load-supporting face that is made in contact with the end face of the other of the first and second load-receiving members.

3. The load transmission device according to claim 2, wherein said male screw portion and female screw portion are respectively prepared as sawtooth screws.

4. The load transmission device according to claim 1, wherein the pressure-receiving area of said load-applying means is set to be smaller than the pressure-receiving area of said first or second load-receiving member and the load to be transmitted to said first or second load-receiving member becomes greater than the load to be applied to said pressure-transmitting medium by said load-applying means.

5. The load transmission device according to claim 1, wherein the inner face of said pressure chamber that is made in contact with said pressure-transmitting medium is made of steel that has been thermally treated through a carburization quenching process or a nitriding method.

6. The load transmission device according to claim 1, wherein said spherical members include rigid spherical bodies.

7. The load transmission device according to claim 1, wherein said spherical members include elastic spherical bodies.

8. The load transmission device according to claim 1, wherein said spherical members include rigid spherical bodies and elastic spherical bodies.

* * * * *